US011515936B2

(12) United States Patent
Iyer et al.

(10) Patent No.: US 11,515,936 B2
(45) Date of Patent: Nov. 29, 2022

(54) SYSTEM FOR DISTRIBUTED TRANSFER OF UPLINK STATE DATA

(71) Applicant: AMAZON TECHNOLOGIES, INC., Seattle, WA (US)

(72) Inventors: Jayasuryan Venkita Subramaniyan Iyer, Sammamish, WA (US); Deepak, Sammamish, WA (US); Ali Masoomzadeh, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 15 days.

(21) Appl. No.: 17/164,283

(22) Filed: Feb. 1, 2021

(65) Prior Publication Data

US 2022/0247486 A1 Aug. 4, 2022

(51) Int. Cl.
  *H04B 7/185* (2006.01)
  *H04W 76/15* (2018.01)
  *H04W 64/00* (2009.01)
  *H04W 76/30* (2018.01)
  *H04L 61/50* (2022.01)
  *H04L 101/622* (2022.01)

(52) U.S. Cl.
  CPC ......... *H04B 7/18539* (2013.01); *H04L 61/50* (2022.05); *H04W 64/00* (2013.01); *H04W 76/15* (2018.02); *H04W 76/30* (2018.02); *H04L 2101/622* (2022.05)

(58) Field of Classification Search
  CPC .......... H04B 7/18539; H04B 7/18541; H04W 76/15; H04W 76/30; H04W 64/00; H04L 2101/622
  See application file for complete search history.

(56) References Cited

U.S. PATENT DOCUMENTS

2017/0041830 A1* 2/2017 Davis ................... H04B 7/1851
2017/0105153 A1* 4/2017 Ashrafi ................ H04B 17/336

FOREIGN PATENT DOCUMENTS

| EP | 1414167 A2 | 4/2004 |
| EP | 3332489 A1 | 6/2018 |
| WO | 2020051508 A1 | 3/2020 |

OTHER PUBLICATIONS

Akhertouz Moreno, Y, "International Search Report and the Written Opinion of the International Searching Authority dated May 9, 2022", Patent Cooperation Treaty Application No. PCT/US22/70124, Patent Cooperation Treaty, dated May 9, 2022.

* cited by examiner

Primary Examiner — Keith Ferguson
(74) Attorney, Agent, or Firm — Lindauer Law, PLLC

(57) ABSTRACT

A satellite provides communication between user terminals (UTs) and ground stations that connect to other networks, such as the Internet. Because the satellite is within range of many UTs at any given time, many UTs are in contention to use an uplink to send data to the satellite. Each satellite manages uplink contention by maintaining state data representative of the uplink resources allocated for use. As satellites move, handovers take place, transferring communication services from a first satellite to a second satellite. Before a handover, a first satellite sends state data to a UT. The second satellite is also informed about the UT. After the handover, the second satellite provides the UT with priority access to the uplink to send the state data to the second satellite. The second satellite uses the state data to resume management of the uplink, eliminating the need for time consuming link setup.

20 Claims, 7 Drawing Sheets

SYSTEM FOR DISTRIBUTED TRANSFER OF UPLINK STATE DATA

BACKGROUND

A constellation of satellites may provide communication service to many user terminals. These user terminals may be handed off from one satellite to another. Individual user terminals contend with one another for use of an uplink to send data to a satellite providing communication services.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
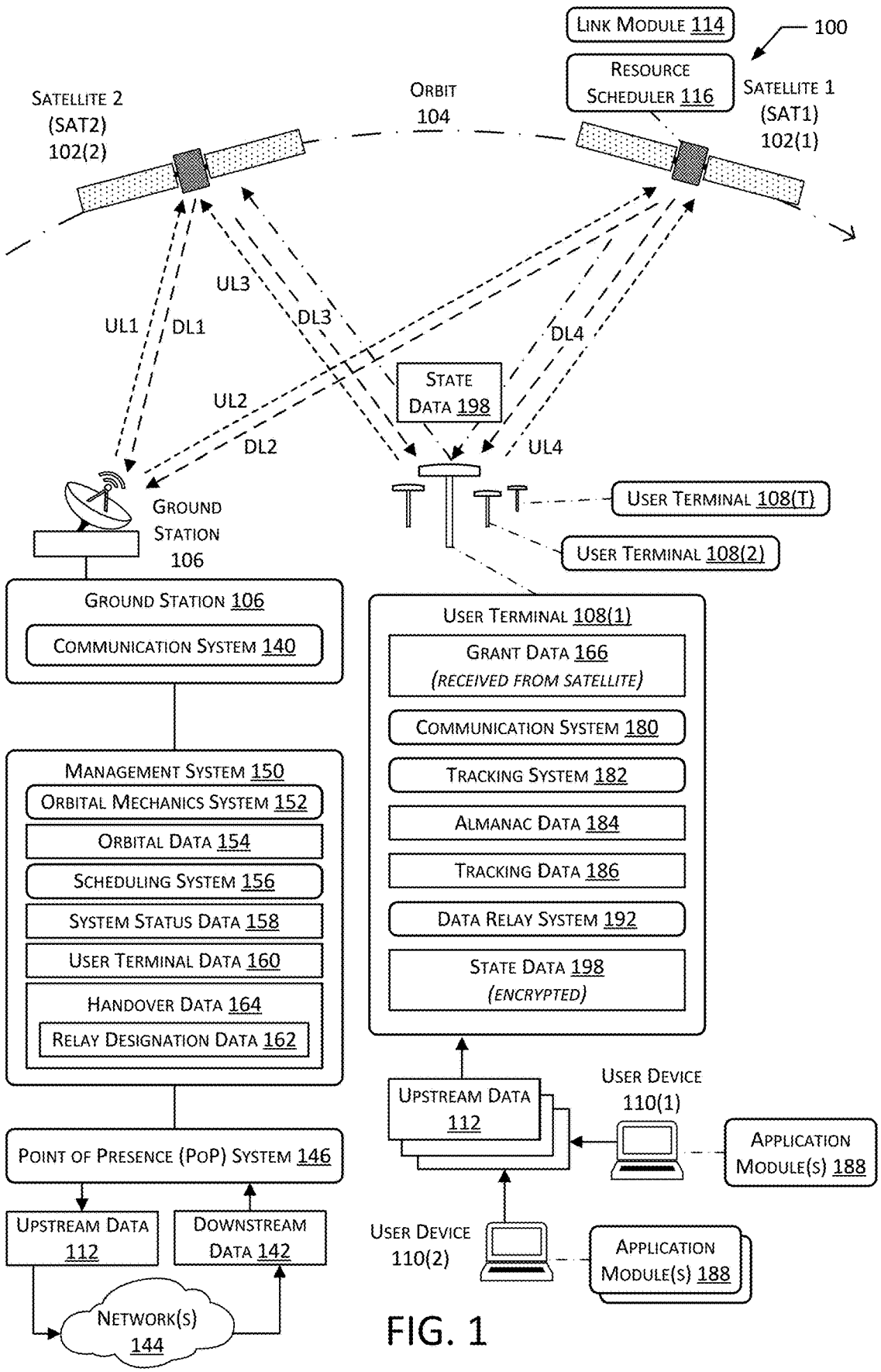
FIG. 1 illustrates a system that uses a distributed transfer of uplink state data from a first satellite to a second satellite, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize satellites to wirelessly transfer data between user terminals and ground stations that in turn connect to other networks, such as the Internet. Compared to terrestrial wireless systems, the cost to place and maintain individual satellites, the large geographic coverage area of a given satellite, and a substantial number of user terminals served by each satellite, may result in an oversubscribed network that includes several congestion points that restrict the flow of network traffic. One congestion point is an uplink to the satellite, as many individual user terminals contend with each other to use the uplink to send data to the satellite.

The satellites provide communication services between devices, such as user terminals (UT) located on or near a body such as the Earth. For example, a first UT on a first geographic location (geolocation) on the Earth may send upstream data to a first satellite that is in range of the first UT. The first satellite may send the upstream data to a ground station, another satellite, and so forth. For example, the first satellite may send the upstream data to a ground station that in turn sends the upstream data to a point-of-presence (PoP). The PoP may then send the upstream data to a device on another network, such as a server on the Internet.

Likewise, downstream data destined for the first UT may be received at the PoP. The PoP sends the downstream data to the ground station that in turn sends the downstream data to the first satellite. The first satellite then sends the downstream data to the first UT. For ease of illustration, and not necessarily as a limitation, a satellite may be deemed "in range" of a UT when communication may take place. For example, a satellite may be in range when it is within line of sight of the UT, a distance between the satellite and the UT is less than a threshold distance, the UT is within a footprint of an antenna onboard the satellite, and so forth. One of the factors that determines how long a satellite is within range of the UT is the orbital period of the satellite, that is determined by the altitude of the satellite.

The period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite may be in range of a particular UT for only a few minutes. This results in a UT being frequently handed off from one satellite to another to maintain continuous communication services. For example, these handoffs may occur about every nine minutes. In comparison, a geosynchronous satellite has an orbital period that coincides with the rotation of the Earth, so a geosynchronous satellite appears to remain motionless with respect to the Earth. While the apparent motionlessness with respect to the UT removes the need for handoffs, other drawbacks associated with the geosynchronous satellite remain.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving a non-geosynchronous orbit (NGO) satellite at an altitude of 600 km only introduces about 4 ms of latency comprising 2 ms up to the satellite and 2 ms down to the UT. However, the latency does vary as distance to the NGO satellite changes. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the UT and the satellite allow for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

While the latency introduced by propagation delay in an NGO satellite is less than that of geosynchronous satellites, the dynamic nature of the network using many NGO satellites introduces factors that complicate contention for an uplink to a satellite and management of the uplink. For example, as mentioned earlier, an individual satellite is only within communication range of a UT for a few minutes. This results in frequent handoffs of a large number of user terminals from one satellite to another. Efficient management of the uplink during use and the handover process itself becomes particularly important in this dynamic environment as poor management reduces throughput on the uplink. Reduced throughput may result in data being delayed, dropped, or other unacceptable outcomes.

Traditional techniques of managing an uplink are not intended for and so do not scale well to large numbers of UTs, particularly when those UTs are sending large quantities of data. For example, a sparse number of terminals in a conventional satellite system may each be assigned uplink resources in advance. However, this system is inflexible and results in unused capacity in the event a UT has no data to send. In another example, a sparse number of terminals making relatively short transmissions may attempt to use the uplink by transmitting at any time. However, this may result in the satellite receiving several overlapping signals, preventing successful decoding. The situation is further complicated by the variable nature of when upstream data is generated and sent to the UT. Some applications executing on a user device may generate traffic on a regular schedule, while others may be "bursty" in that a large amount of data is sent in rapid succession followed by a quiescent period.

Additionally, the ongoing handovers of communication service for a set of user terminals from one satellite to the next introduce a substantial complication using traditional systems. For example, traditional techniques involve the satellite that is taking over communication service to establish connections with the user terminals and begin anew the allocation of uplink resources. This introduces substantial delays to transfer of traffic following a handover as many user terminals contend for access. As a result, traditional techniques of managing an uplink are infeasible in a large satellite network that may involve thousands of satellites, millions of UTs, and frequent handovers.

Described in this disclosure is a system for distributed transfer of uplink state data from a first satellite to a second satellite using one or more UTs. The state data is indicative of an uplink of the first satellite before handover to the second satellite. For example, the state data may comprise buffer data status that indicates particular UTs and how much data they are scheduled to send on the uplink. By providing reasonably current state data from the first satellite to the second satellite, delays associated with determining that state data is eliminated. The second satellite may use the state data received from the first satellite to bootstrap uplink allocation after the handover, eliminating or significantly reducing the time and resources needed to begin scheduling anew the uplink resources after the handover.

Various techniques may be used to select one or more UTs to relay the state data. In one implementation, a management system may select particular UTs to act as relays and inform the first satellite and the second satellite of the selection. That information may then be used to designate which UTs to send the state data to, and which to retrieve from. In another implementation, the state data may be broadcast by the first satellite to many UTs. Individual ones of the UTs may then provide the state data to the second satellite after handover. In other implementations other techniques may be used.

The system provides for an extremely low latency, redundant, secure, and low cost way to rapidly transfer uplink state data from a first satellite to a second satellite that is scheduled to take over providing the communication service to a set of UTs. Additionally, the system does not utilize intersatellite links. Depending on a variety of factors, intersatellite links may be unavailable. For example, the satellites may not be equipped for intersatellite communication, an intersatellite link may be inoperable, intersatellite communication may not be possible due to orbital differences or occlusion by intervening objects, and so forth. The system described avoids the transfer of uplink state data using a ground segment that would introduce substantial latencies. For example, unpredictable latencies due to varying terrestrial network conditions are eliminated, improving system predictability and performance.

By using the system and techniques described in this disclosure, delays to uplink traffic in a communication system using a satellite constellation are substantially reduced. Communication service during a handover is provided more quickly, improving overall performance.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites is limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the lower altitude of the satellite in NGO, compared to a geosynchronous orbit, provides coverage over a much smaller portion of the Earth. The lower altitude also reduces the distance the electromagnetic signal has to travel. For example, the satellite at 600 km only introduces 4 ms of latency for a single hop. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of communication satellites 102(1), 102(2), . . . , 102(S), each communication satellite 102 being in orbit 104. Also shown is a ground station 106, user terminals (UTs) 108, and user devices 110. Each user device 110 may execute one or more application modules 188. For example, the application modules 188 may comprise email applications, telephony applications, videoconferencing applications, telemetry applications, web browser applications, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104.

Each satellite 102 may include a link module 114 and resource scheduler 116. The link module 114 is used to establish communication with other devices. The link module 114 may include one or more transmitters, receivers, antennas, digital signal processors, and so forth. The resource scheduler 116 may comprise one or more processors executing instructions to manage the link module 114 and maintain communication service such as a radio communication link with other devices. For example, the resource schedule 116 may receive requests for allocation of uplink resources from individual UTs 108, determine grant data 166 allocating uplink resources to the requesting UTs 108, send the grant data 166 to the requesting UTs 108, and so forth. The resource scheduler 116 may determine state data 198 during operation. The satellite 102 is discussed in more detail with regard to FIG. 2.

A ground segment of the system 100 may comprise one or more ground stations 106 that are in communication with one or more satellites 102. The ground stations 106 may pass data between the satellites 102, a management system 150, networks 144 such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground segment may include or utilize one or more communication networks 144. For example, the ground station 106 may connect to a terrestrial fiber optic communication network 144. The ground station 106 may act as a network gateway, passing data between the one or more communication networks 144 and the satellites 102, between ground stations 106, and so forth. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156. The management system 150 may comprise one or more servers or other computing devices.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data 164 that indicates when communication is to be transferred from the first satellite 102(1) to the second satellite 102(2). Continuing the example, the scheduling system 156 may also specify communication parameters such as frequency, timeslot indicative of when transmission is permitted, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of data. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a geographic location (geolocation) of a particular UT 108. The user terminal data 160 may also include other information such as a priority assigned to data associated with that UT 108, a type or category of UT that is indicative of the communication capabilities of that particular UT 108, and so forth. For example, a first UT 108(1) may be a first category of device that has more powerful transmitters, backup power supply, and so forth and may be used in a business. Continuing the example, a second UT 108(2) may be in a second category of device, using less expensive and less powerful transmitters, omitting the backup power supply, and may be used at a residence. The user terminal data 160 may also include information such as a priority allocation associated with a particular UT 108. For example, the first UT 108(1) may be assigned a higher priority relative to the second UT 108(2). Over time, different versions, types, or categories of UTs 108 may be deployed, having different communication capabilities such as being able to operate at particular frequencies, supporting different signal encoding schemes, having different antenna configurations, and so forth.

The handover data 164 is indicative of information such as a UT identifier indicative of a particular UT 108, a handover time indicative of when a handover is to occur, a next satellite identifier (ID) that is indicative of the next satellite 102 that will be providing communication service to the specified UT 108, and so forth. The handover data 164 facilitates an orderly transition of the UT 108 from a first satellite 102(1) to a second satellite 102(2).

The handover data 164 may include relay designation data 162. The relay designation data 162 is indicative of one or more UTs 108 that are expected to be used to transfer at least a portion of state data 198 from the first satellite 102(1) to the second satellite 102(2).

While providing communication services to a first set of UTs 108, the resource scheduler 116 of the first satellite 102(1) manages access to its uplink. This management may include, but is not limited to, allocating communication resources of the uplink to the individual UTs 108 in the first set of UTs 108. For example, the first UT 108(1) may request uplink resources to send 10 MB of data, while the second UT 108(2) requests uplink resources to send 15 MB, and so forth. The state data 198 comprises information associated with the uplink managed by the first satellite 102(1). For example, the state data 198 may comprise buffer status data indicative of media access control (MAC) addresses, scheduled times, quantity of data allocated to individual UTs 108 that is queued for transmission on the uplink, whether a grant allocating use of the uplink at a later time has been sent, and so forth.

Without at least a portion of the state data 198, the resource scheduler 116 of the second satellite 102(2) would begin link establishment and contention management with no prior knowledge. For example, a random access channel process may be used to being to establish communication among the UTs 108 in the first set of UTs 108. This process takes time and consumes bandwidth and other resources that could otherwise be used to transfer upstream data 112.

In the system 100 described herein, before handover, at least a portion of the state data 198 is sent to a second set of UTs 108. The second set of UTs 108 may be a subset of the first set of UTs 108 that are being provided communication services by the first satellite 102(1) until the handover. After handover, the second set of UTs 108 may be provided with priority access to the second satellite 102(2). In one implementation, the members of a second set of UTs 108 indicated in the relay designation data 162 may be determined by the management system 150. For example, the management system 150 may select a particular category of UTs 108, UTs 108 based on previous link statistics, geolocation indicating where the UT 108 is geographically located, and so forth. For example, the management system 150 may select three UTs 108 within a geographic area that is within communication range of the first satellite 102(1) prior to handover and the second satellite 102(2) after handover. These three UTs 108 may be at some minimum threshold distance away from each other, providing geographic diversity. Reliability of the relay is improved by using more than one UT 108 that are separated from one another. For example, terrestrial weather conditions at the geolocation of the first UT 108(1) may attenuate signals from the first UT 108(1), while the second UT 108(2) at a second geolocation has clear weather and an unobstructed path.

The scheduling system 156 may determine handover data 164 at regular intervals. For example, handover data 164 may be generated for handover assessment intervals that are five seconds long. In other implementations, the handover data 164 may be determined on demand, at irregular intervals, and so forth.

In one implementation, the handover data 164 may involve the scheduling system 156 using the orbital data 154 and the geolocation of the UTs 108 to determine which UTs 108 will be moving out of range of the satellites 102 currently providing communication services to those UTs 108. Based on the orbital data 154 and the geolocation of each UT 108, the next satellite 102 may be determined. For example, this may be a satellite 102 that is already in range, or will be in range, at the handover time. In some implementations the handover data 164 may include a set of next satellites 102. For example, the handover data 164 may comprise a set of satellite IDs that indicate a primary satellite and a secondary satellite. Continuing the example, the second satellite 102(2) may be designated as the primary satellite expected to begin providing communication service to the UT 108 at the handover time. In the event the satellite 102(2) is unable to allocate resources to provide communication service to the UT 108, exception data indicative of this may be generated and provided to one or more of the network management system 150, a secondary satellite 102(3), the UT 108, or other devices. For example, the second satellite 102(2) may use a UT 108 to relay the exception data to the first satellite 102(1) and the secondary satellite 102(3). The first satellite 102(1) may send the exception data to the UT 108. The secondary satellite 102(3) may then allocate resources to provide communication service to the UT 108, and may subsequently provide the communication service beginning at the handover time.

The satellite 102 providing communication services may manage its uplink by providing grant data 166 to UTs 108. The grant data 166 is indicative of one or more parameters associated with uplink communication between the UT 108 and the satellite 102. For example, the grant data 166 may indicate the uplink frequency, downlink frequency, assigned timeslot, signal encoding, quantity of data permitted to be sent, and forth. In one implementation, the grant data 166 may be generated by the satellite 102. For example, the satellite 102(1) may receive uplink requests and responsive to those uplink requests send grant data 166. During operation, the satellite 102 maintains the state data 198 of the uplink.

The UT 108 includes a communication system 180 to establish communication with one or more satellites 102 and transfer data. The communication system 180 may comprise a network interface. The UT 108 passes data between the constellation of satellites 102 and the user device 110. The user device 110 may execute one or more application modules 188. The data transferred includes upstream data 112 sent by the user device 110 or downstream data 142 that is addressed to the UT 108 or the user device 110. For example, during operation the application module 188 may send upstream data 112 and receive downstream data 142. The upstream data 112 and the downstream data 142 each may comprise header data and payload data. The UT 108 may be fixed or in motion. For example, the UT 108 may be used at a residence, business, or on a vehicle such as a car, boat, aerostat, drone, airplane, and so forth.

During operation, the communication system 180 may utilize the grant data 166 received from the satellite 102. For example, the UT 108 may request uplink resources to send the upstream data 112. Responsive to the request, the satellite 102 may send grant data 166 allocating uplink resources for the UT 108 to use to send the upstream data 112 to the satellite 102.

The communication system 180 of the UT 108 may include components similar to those of the communication system of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. Continuing the example, the network interface may comprise the communication system 180.

The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite 102(2), time of flight correction, or other information associated with a specified time. The determination of the tracking data 186 may be ongoing. For example, the first UT 108 may determine tracking data 186 every 100 ms, every second, every five seconds, or at other intervals.

With regard to FIG. 1, the uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106.

In some implementations, the satellites 102 may also be in communication with one another. For example, an inter-satellite link (ISL) may provide for communication between satellites 102 in the constellation.

The UT 108 may send upstream data 112 using the system 100. For example, the upstream data 112 may originate from the UT 108, or may be received by the UT 108 from a user device 110. The upstream data 112 may comprise a single packet or other unit of data transfer, or a plurality of packets or other units of data transfer. The upstream data 112 may be addressed to a device. The device that the upstream data 112 is addressed to may be accessible using one or more networks 144, such as the Internet.

The user terminal 108 includes a data relay system 192. The data relay system 192 stores and forwards data from a first satellite 102(1) to a second satellite 102(2). For example, before handover, the first satellite 102(1) sends at least a portion of the state data 198 to one or more UTs 108. In one implementation the entirety of the state data 198 may be sent to the one or more UTs 108. In another implementation, a subset of the state data 198 may be sent to the one or more UTs 108. For example, state data 198 associated with a specified interval of time, such as the next 250 milliseconds, may be sent. In another example, state data 198 associated with particular categories of UTs 108 may be sent. In yet another example, the state data 198 associated with particular types of data traffic may be sent.

The data relay system 192 of the one or more UTs 108 stores the state data 198. After handover, the data relay system 192 sends the state data 198 to the second satellite 102(2). The data stored and forwarded by the data relay system 192 may be encrypted, with the UT 108 unable to decrypt the data. The process to relay state data 198 is discussed in more detail below with regard to FIGS. 3-6B.

In one implementation, a ground station 106 may be used to relay the state data 198 from the first satellite 102(1) to the second satellite 102(2). In this implementation, the ground station 106 may include the data relay system 192. However, depending upon various factors including the geographic location of the ground station 106 and the respective orbits, the ground station 106 may be unable to directly communicate with both the first satellite 102(1) and the second satellite 102(2).

While the system 100 is in operation, a quantity of UTs 108 is expected to far exceed the number of ground stations 106. Compared to the ground station(s) 106, more UTs 108 are present within a common communication footprint of both the first satellite 102(1) and the second satellite 102(2). As a result, the use of a UT 108 to relay the state data 198 as compared to a ground station 106 provides improved availability for the relay and improved reliability that the relay will be successfully completed with low latency.

Ground stations 106 may have more substantial communication infrastructure, such as uplink transmitters with greater power than a UT 108, antennas with greater gain than a UT 108, sites that provide clear line of sight from horizon to horizon, and so forth. As a result, a ground station 106 may have a substantially greater link budget during communication with a satellite 102 than a UT 108. As a result, the range at which reliable communications may take place between the ground station 106 and the satellite 102 may be greater than the range between the satellite 102 and a UT 108. However, due to the relatively small number of ground stations 106 and their respective geographic placement, even with this increased range there may be situations in which the same ground station 106 will not be in communication range of both the first satellite 102(1) and the second satellite 102(2) within a desired interval of time. As a result, the use of the UTs 108 to relay the state data 198 provides a substantial advantage in providing a low latency transfer of data between the first satellite 102(1) and the second satellite 102(2).

The system 100 may include one or more PoP systems 146. Each PoP system 146 may comprise one or more servers or other computing devices. Separate PoP systems 146 may be located at different locations. In one implementation, a PoP system 146 may be associated with providing service to a plurality of UTs 108 that are located in a particular geographic region.

The PoP systems 146 may manage communication between the system 100 and the network 144. For example, a first PoP system 146 may receive the upstream data 112 and send that upstream data 112 to the network 144. In another example, the first PoP system 146 may receive the downstream data 142 and proceed to attempt delivery of the downstream data 142 to the UT 108.

The PoP system 146 is in communication with one or more ground stations 106(1), 106(2), . . . , 106(G) and the management system 150. In some implementations one or more functions may be combined. For example, the PoP system 146 may perform one or more functions of the management system 150. In another example, the PoP system 146 may be included in an integrated ground station 106.

The PoP system 146 may determine the UT 108 that the downstream data 142 is addressed to and determines first communication resource data. The first communication resource data specifies the communication resources, such as ground station 106, uplink modem at the ground station 106, satellite, downlink modem on the satellite, and so forth that would result in delivery of the downstream data 142 to the UT 108. The downstream data 142 may comprise a single packet or other unit of data transfer, or a plurality of packets or other units of data transfer that are associated with delivery to the particular UT 108.

The satellite 102, the ground station 106, the user terminal 108, the user device 110, the management system 150, the PoP system 146, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

Figure 2:
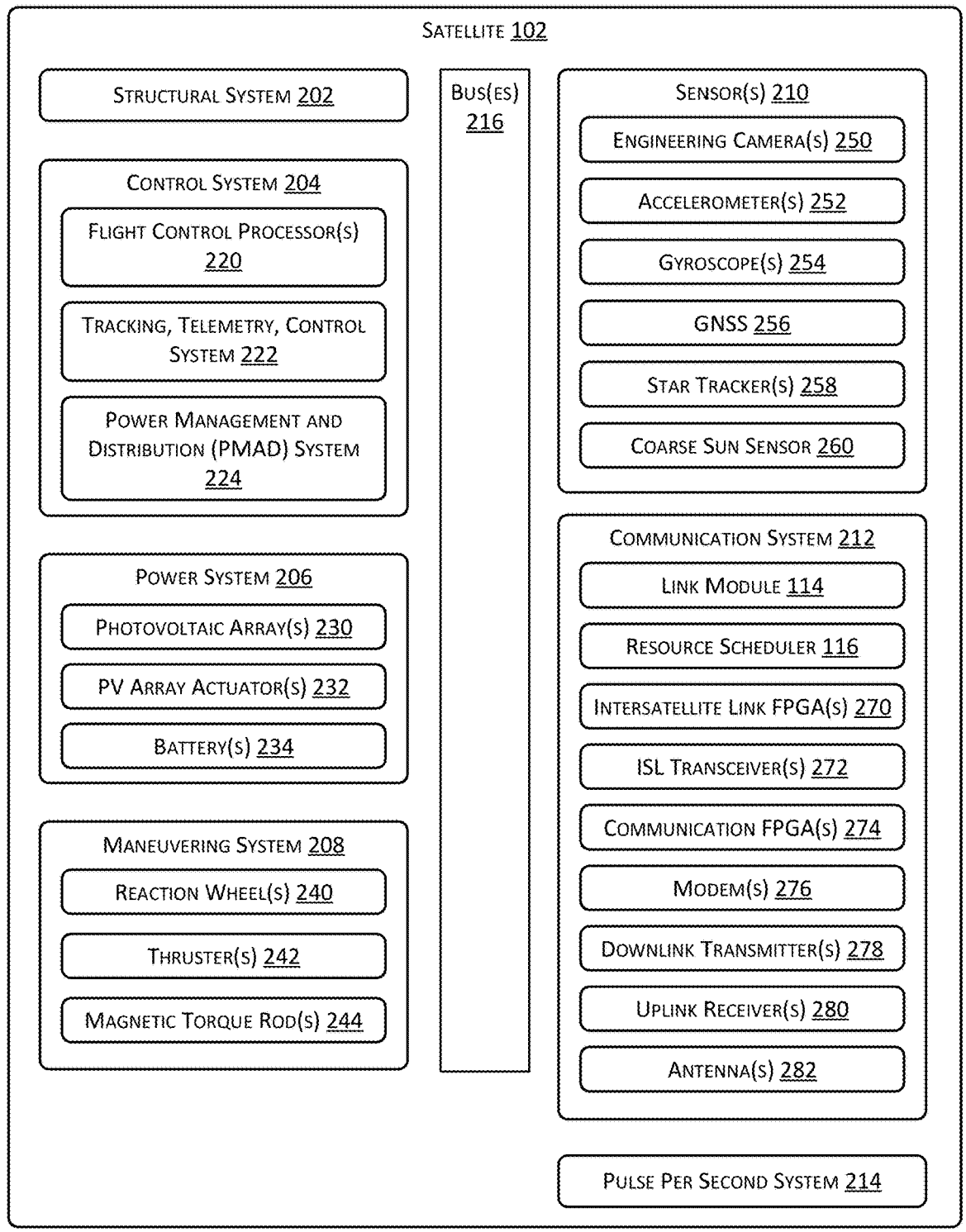
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more buses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellant. For example, an electrothermal thruster may use water as propellent, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may comprise the link module 114 and the resource scheduler 116. In one implementation, the link module 114 may comprise an antenna 282 such as a phased array antenna that is capable of simultaneously providing multiple subbeams. A subbeam may be targeted to cover a specified portion of the Earth while the satellite 102 is in a particular portion of the orbit 104. For example, the link module 114 may adjust the direction of the subbeam relative to the satellite 102 to keep the subbeam pointed at a target location on the Earth while the satellite 102 is above the horizon and in range of that target location. As the satellite 102 moves out of range of the target location, the subbeam may be retargeted to another target location that is moving into range. The different subbeams on the satellite 102 may be directed to different target locations. In another implementation, the subbeam may continuously sweep across the surface of the Earth, such as in a line parallel to a ground track of the satellite 102. This is described in more detail with regard to FIG. 5.

The communication system 212 may include one or more modems 276, digital signal processors, power amplifiers, antennas (including at least one antenna that implements multiple antenna elements, such as a phased array antenna) 282, processors, memories, storage devices, communications peripherals, interface buses, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission.

Each satellite may use one or more antennas 282 or antenna elements to provide a beam for transmission and reception of radio signals. For example, the satellite 102 may have a phased array antenna that allows for gain in a particular direction. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102.

The beam provided by the satellite 102 may comprise a plurality of subbeams. Subbeams on a satellite 102 may use different frequencies, timeslots, and so forth, to communicate with the UT 108. Each subbeam provides coverage of a particular geographic area or "footprint". Compared to a single beam, subbeams provide several advantages. For example, by using subbeams, radio frequencies may be reused by the same satellite 102 and other satellites 102 to service different areas. This allows increased density of UTs 108 and bandwidth.

During a pass over of a particular location on the Earth, each subbeam may be targeted to a geographic location on the Earth. While that target geographic location is in range of the satellite 102, the subbeam tracks the target location. As the satellite 102 moves in orbit 104, the boundary of the footprint may change due to the relative angle between the satellite 102 and the earth. For example, the footprint boundary may change from approximately an oval shape while the satellite 102 is low on the horizon relative to the target location, a circular shape while directly overhead, then an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam. For example, a first modem 276(1) provides communication to UTs 108 in a first geographic area using a first subbeam while a second modem 276(2) provides communication to UTs 108 in a second geographic area using a second subbeam.

In some implementations, the communication system 212 may include hardware to support an intersatellite link. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

The communication system 212 may determine grant data 166 that specifies uplink resources for a UT 108 to communicate with the satellite 102. For example, the communication FPGA 274 may process a grant request that is received from a UT 108 by the uplink receiver 280. Responsive to the grant request, and subject to the availability of communication resources associated with the uplink, the communications FPGA 274 may determine grant data 166 that is then sent using the downlink transmitter 278.

Figure 3:
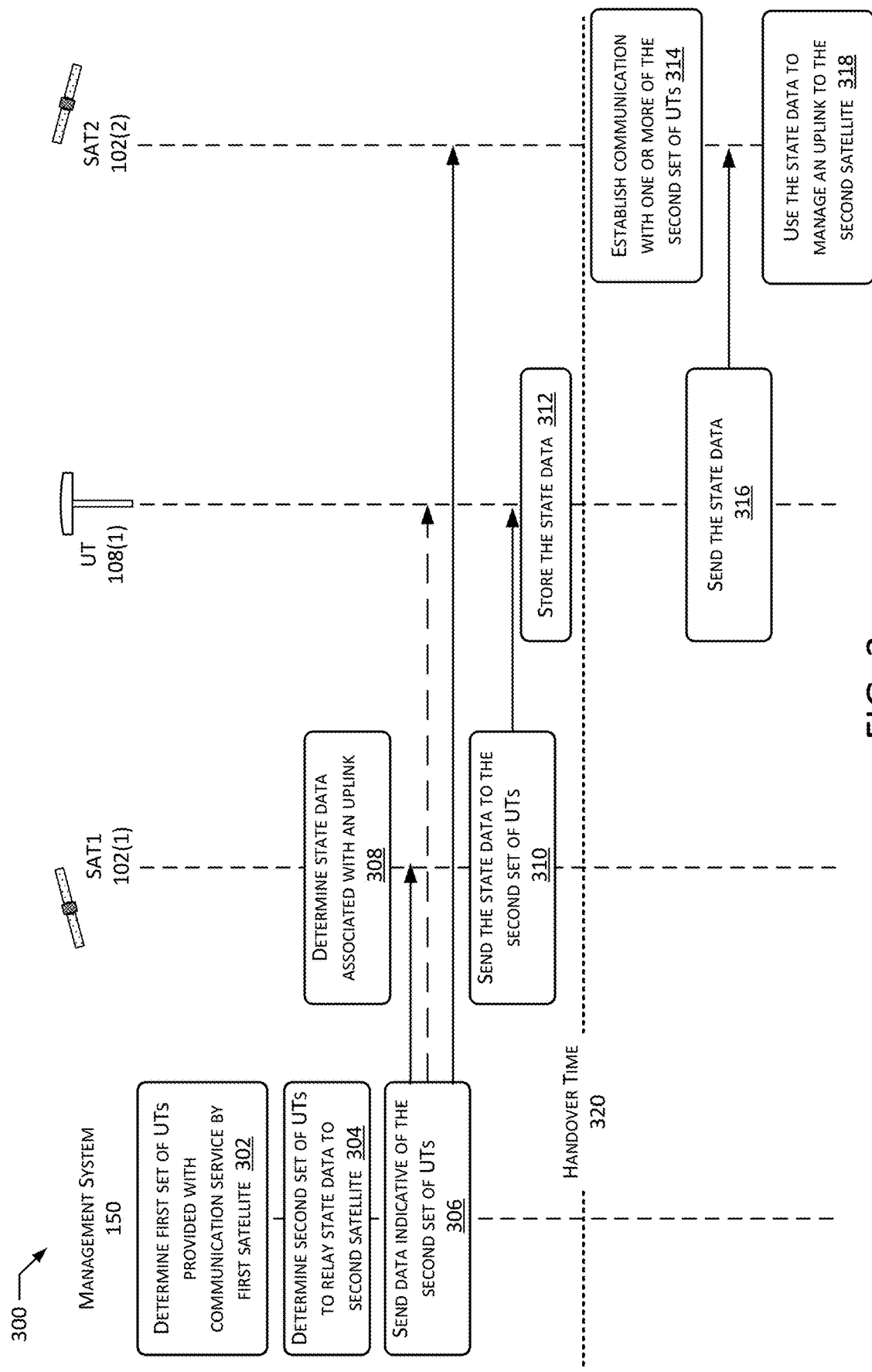
FIG. 3 illustrates a process of distributed transfer of uplink state data, according to some implementations.

FIG. 3 illustrates a process of distributed transfer of uplink state data, according to some implementations. In this illustration, time generally increases from top to bottom. For example, an operation depicted at the top of the page may occur before an operation depicted at the bottom of the page.

In this illustration, the management system 150, the first satellite 102(1), the first UT 108(1), and the second satellite 102(2) are shown. Other elements of the system 100 are omitted from this illustration for clarity, and not as a limitation. The process may be implemented at least in part by one or more of the devices shown.

At 302 the management system 150 determines a first set of UTs 108 are provided with communication by the first satellite 102(1). The management system 150 may assign a UT 108 to a set that is associated with a particular geographic area. For example, the first set may comprise the UTs 108 that have geolocations within a specified geographic area that is predicted to be provided with communication service by the first satellite 102(1). In other implementations, the first set may be based on other factors. For example, the first set of UTs 108 may be determined by the management system 150 as those UTs 108 that are predicted to be within communication range of the first satellite 102(1) at a particular time.

Each satellite 102 may provide communication services to a set of UTs 108 that are within range during some period of time. The UTs 108 within the first set may remain the same, while the satellites 102 moving overhead handover communication service to subsequent satellites 102.

At 304 a second set of UTs 108 is determined before a handover time. The second set of UTs 108 specifies those UTs 108 that are designated to be used to relay the state data 198 from the first satellite 102(1) to the second satellite 102(2). The second set of UTs 108 may be determined by one or more of the management system 150, the first satellite 102(1), or another system. The second set of UTs 108 may be a subset of the first set of UTs 108.

In one implementation, the management system 150 may utilize system status data 158, user terminal data 160, and so forth to select UTs 108 to be included in the second set of UTs 108. For example, performance data may be determined that is indicative of performance of connections between UTs 108 and the satellite 102. The performance data may include one or more of link reliability data, link bandwidth data, link error rate data, and so forth. The selection of the second set of UTs may be based at least in part on the category or type of UT 108. For example, a business-grade UT 108 may be preferred to provide relay service relative to a consumer-grade UT 108. The selection of the second set of UTs 108 may be based at least in part on geolocation of the UTs 108. For example, the second set of UTs 108 may be selected that are geographically dispersed through a geographic area corresponding to a footprint boundary. The second set of UTs 108 may comprise UTs 108 that are currently in communication with, or are predicted to be in communication with, the first satellite 102(1) and the second satellite 102(2) within a threshold time of the handover time. For example, the second set of UTs 108 may comprise UTs 108 that are predicted to be within communication range of both the first satellite 102(1) and the second satellite 102(2) at the handover time. In another example, the second set of UTs 108 may comprise UTs 108 that are predicted to be within communication range of the first satellite 102(1) until 300 milliseconds before the handover time and are also predicted to be within communication range of the second satellite 102(2) within 300 milliseconds after the handover time. Determination of the second set of UTs 108 is discussed in more detail with regard to FIG. 5.

At 306 data indicative of the second set of UTs 108 is sent to one or more of the first satellite 102(1) that is providing communication services before the handover time, one or more of the UTs 108 in the second set of UTs 108, or the second satellite 102(2) that will be providing communication services after the handover time. The data indicative of the second set of UTs 108 may be sent using at least a portion of the ground segment. For example, the data indicative of the second set of UTs 108 may be sent from the management system 150 to both a first ground station 106(1) that in turn sends the data to the first satellite 102(1) and a second ground station 106(2) that in turn sends the data to the second satellite 102(2).

At 308 the state data 198 associated with the uplink to the first satellite 102(1) is determined. For example, during operation of the first satellite 102(1) to provide communication services to the first set of UTs 108, the state data 198 changes over time. At a specified time, such as 20 milliseconds before the handover time, the state data 198 then in memory of the first satellite 102(1) may be stored. The state data 198 may be compressed, encrypted, or otherwise processed before sending. The state data 198 transferred to the second set of UTs 108 may be a subset of the entirety of the state data 198 of the first satellite 102(1). For example, the state data 198 sent to the second set of UTs 108 may be selected from the entirety of the state data 198 onboard the first satellite 102(1) based on one or more parameters. Continuing the example, the parameters may include one or more of time, category of UT, quantity of data enqueued for uplink, type of traffic, and so forth. For example, the state data 198 may comprise information about uplink traffic that is associated with low latency services, such as voice over internet protocol (VOIP), gaming, realtime control, and so forth.

At 310 the state data 198 is sent to the second set of UTs 108. For example, the encrypted state data 198 is sent from the first satellite 102(1) to the UTs 108 in the second set of UTS 108. In one implementation the state data 198 may be addressed to particular UTs 108 as specified by the data indicative of the second set of UTs 108. In another implementation the state data 198 may be multicast to the second set of UTs 108. In yet another implementation the state data 198 may be broadcast to the entire first set of UTs 108.

In one implementation, the entirety of the state data 198 may be sent to an individual one of the UTs 108 in the second set of UTs 108. In some implementations, the state data 198 or other data for relay from the first satellite 102(1) to the second satellite 102(2) may be distributed across the second set of UTs 108. For example, each UT 108 may be constrained to relaying less than 1 MB of data. If the state data 198 is 3 MB in total size, the state data 198 may be divided into three 1 MB portions, each portion being sent to a different UT 108. In some implementations, the state data 198 (encrypted or cleartext) may be distributed across the UTs 108 to improve security by eliminating the ability for any one UT 108 to have stored the entirety of the state data 198.

At 312 the second set of UTs 108 receive and store the state data 198. For example, the data relay system 192 may process the incoming state data 198 and store for transmission. In some implementations the data relay system 192 may further encrypt or store the data for relay in a secure computing environment. In one implementation, the data relay system 192 may digitally sign the state data 312 before transmission. The data relay system 192 may be inaccessible to the end user of the UT 108. For example, the data relay system 192 may be limited to use by one or more satellites 102, to only respond to instructions received via downlink and not from a local area network connection, and so forth.

At or about a handover time 320, the first satellite 102(1) discontinues providing communication services to the first set of UTs 108. At 314, at or after the handover time 320 the second satellite 102(2) establishes communication with at least one or more of the second set of UTs 108. The second set of UTs 108 may be provided with priority access to the uplink. The priority access prioritizes use of the uplink to allow one or more particular UTs 108 to send data via the uplink. For example, the second satellite 102(2) may issue grant data 166 that prioritizes access to the uplink to the UTs 108 that are specified in the data indicative of the second set of UTs 108 that was received from the management system 150. This may allow the UTs 108 in the second set of UTs 108 to send their data, including the state data 198, on the uplink before other UTs 108 that are not part of the second set of UTs 108.

At 316, the one or more UTs 108 in the second set of UTs 108 send the state data 198 to the second satellite 102(2). For example, responsive to the grant data 166 indicative of priority access, the data relay system 192 of the first UT 108(1) may retrieve the state data 198 from memory and send the state data 198 using the communication resources allocated by the grant data 166 using the uplink. In some implementations, a plurality of UTs 108 in the second set of UTs 108 may send their respective copies of the state data 198 to the second satellite 102(2).

At 318 the second satellite 102(2), having received the state data 198, uses the state data 198 to manage an uplink to the second satellite 102(2). For example, the state data 198 may be used to resume handling uplink traffic where the first satellite 102(1) may have left off. As a result of having the state data 198 available, the second satellite 102(2) eliminates or reduces the time consuming process of reestablishing the allocation of uplink resources with no data.

Figure 4:
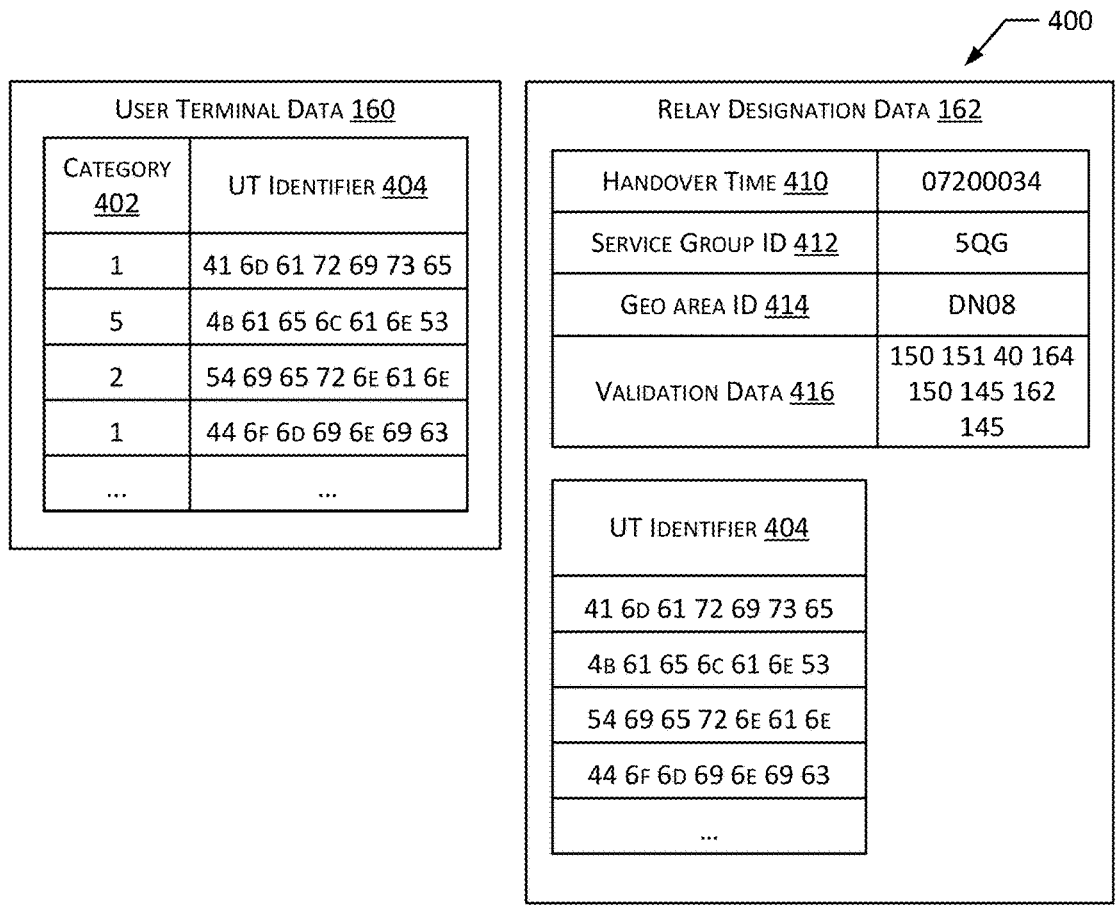
FIG. 4 illustrates data associated with operation of the system, according to some implementations.

FIG. 4 illustrates at 400 communication user terminal data 160, relay designation data 162, and state data 198 associated with operation of the system 100, according to some implementations. The user terminal data 160 may include data indicative of a category 402 that is associated with a particular UT identifier 404. The category 402 may be indicative of a make, model, type, or capabilities associated with the respective UT 108. For example, a category 402 may be indicative of one or more of particular hardware configuration, software configuration, communication capabilities, and so forth. The UT identifier 404 comprises data indicative of a particular UT 108. For example, the UT identifier 404 may comprise a serial number, media access control (MAC) address, and so forth. In some implementations, the UT identifier 404 may be persistent to a particular UT 108, such as a MAC address, or may be dynamically assigned. The user terminal data 160 may include other information (not shown). For example, the user terminal data 160 may include information indicative of a current geolocation, a predicted geolocation at a particular time or interval, geo area identifier 414, service group identifier 412, and so forth.

The relay designation data 162 may comprise information indicative of one or more UTs 108 that are used to relay data from the first satellite 102(1) to the second satellite 102(2). In some implementations, the relay designation data 162 may be used at least in part to provide priority access to the uplink after handover. The relay designation data 162 may include data indicative of handover time 410 that the relay designation data 162 is to be used for. A service group identifier (ID) 412 may specify a particular set of UTs 108. For example, the service group ID 412 may designate the first set of UTs 108 that are being provided with communication service by the first satellite 102(1), that will then be handed over to the second satellite 102(2). A geo area identifier (ID) 414 may specify a geographic area that is associated with the relay designation data 162. For example, the geo area ID 414 may specify a particular grid square, hexagon, political boundary, and so forth. Validation data 416 may also be included. The validation data 416 may comprise a hash, digital signature, or other data that may be used to validate, authenticate, or otherwise provide attribution for the state data 198. The relay designation data 162 also comprises information indicative of the one or more UTs 108 of the second set. For example, the relay designation data 162 may comprise a list of UT identifiers 404.

The state data 198 comprises information associated with management of the uplink of the first satellite 102(1). This may include data directly used in the management of the uplink, data derived from the management of the uplink, and so forth. In this illustration, the state data 198 includes a timestamp 420. The timestamp 420 may be indicative of a time the state data 198 was captured, stored, or otherwise processed for sending to the UTs 108 in the second set of UTs 108.

The state data 198 may comprise information indicative of the UTs 108 that the state data 198 is associated with. For example, the state data 198 may include the service group ID 412. In another example, the state data 198 may comprise a list of individual UT identifiers 404. The state data 198 may comprise other information, such as a scheduled time 424 indicative of when a specified UT identifier 404 is scheduled to use the uplink, a quantity of data allocated to individual UTs 108 that is queued for transmission on the uplink, such as KB for transfer 426, whether a grant has issued 428 to the UT 108 to allocate use of the uplink at a later time, and so forth. In other implementations the state data 198 may comprise other information associated with operation of the uplink as managed by the first satellite 102(1). The state data 198 may also comprise the validation data 416.

Other data (not shown) may include grant data 166. The grant data may be determined by the resource scheduler 116 to manage the communication resources associated with the uplink. The grant data 166 may include parameters and corresponding values such as the UT identifier 404 the grant data 166 is associated with, uplink frequencies, downlink frequencies, timeslot(s), grant expiration time, quantity of data allocated for uplink, encoding scheme, and so forth. The uplink frequencies may specify the transmit frequencies associated with the uplink. The downlink frequencies may specify the receive frequencies for traffic from the satellite 102. The timeslot may indicate a particular timeslot indicating a particular interval of time that is to be used for sending data on the uplink.

In other implementations, the state data 198 may comprise other information. For example, the state data 198 may consist of an ordered list of UT identifiers 404 or data that is indicative of particular UTs 108. In another example, the state data 198 may consist of one or more group identifiers that specify a predefined set of UTs 108.

Figure 5:
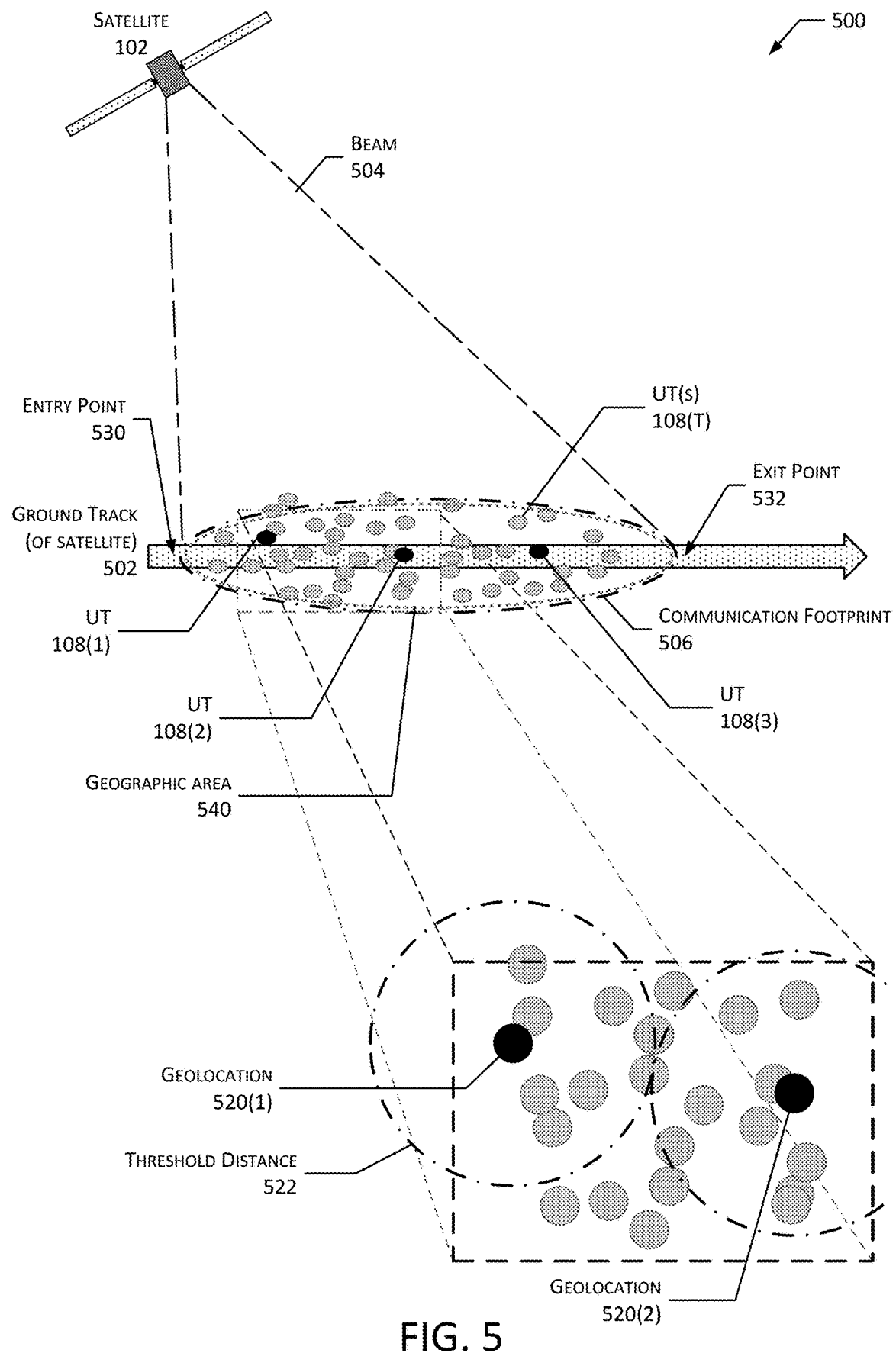
FIG. 5 illustrates selection of user terminals for distributed transfer of uplink state data, according to some implementations.

FIG. 5 illustrates at 500 selection of UTs 108 for distributed transfer of uplink state data 198, according to some implementations. A ground track 502 of the satellite 102 is depicted, with the arrow indicating the direction of motion of the satellite 102. The ground track 502 may be represented as the points directly beneath the satellite 102 as it orbits the Earth or another body. Satellites 102 within the constellation may have the same ground track 502 or different ground tracks 502. For example, the first satellite 102(1) has an orbit described by a first set of orbital parameters while the second satellite 102(2) has an orbit described by a second set of orbital parameters. As a result, a first ground track 502(1) of the first satellite 102(1) may differ from a second ground track 502(2) of the second satellite 102(2).

The satellite 102 in this illustration provides a beam 504. The beam 504 comprises a volume within which one or more of transmission or reception of radio signals by the satellite 102 takes place. For example, the beam 504 may comprise a volume within which a minimum gain field strength of radio energy is provided by a transmitter coupled to an antenna.

In some implementations, the beam 504 may comprise a plurality of subbeams. The subbeams are omitted for clarity and not necessarily as a limitation. On the surface of the Earth, each beam 504 describes a communication footprint 506. The communication footprint 506 may be determined by a boundary of the beam 504 (or the subbeams comprising the beam 504) within which a minimum radio frequency signal strength is provided by a transmitter on the satellite 102. In other implementations, the communication footprint 506 may be described in other ways. For example, the communication footprint 506 may comprise the perimeter of a projection of a cone corresponding to the beam 504. For ease of illustration, and not necessarily as a limitation, the communication footprint 506 is depicted as circular. The communication footprint 506 may vary due to operation of the satellite 102, relative position of the satellite 102 with respect to a subbeam target, and so forth. For example, the communication footprint 506 may change as the relative angle between a beam target location and the satellite 102 changes. In another example, the communication footprint 506 may be approximately rectangular, irregular, and so forth.

As the satellite 102 moves out of range, the beam 504 may be pointed at a different beam target location. For example, the beam may dwell for some period of time, and then at handover time "jump" to cover a different geographic location. In another implementation, the beam 504 may sweep across the Earth, moving parallel to the ground track 502. For example, the beam 504 may be maintained at a fixed angle relative to the Earth. In some implementations a geographic area 540 encompassed by the communication footprint 506 may be designated with a specific geo area ID 414. In some implementations, the geographic area 540 may have a border that is identical to the communication footprint 506, while in other implementations the border of the geographic area 540 may be within the communication footprint 506. For example, as the shape of the communication footprint 506 may change due to the changing relative angle of the satellite 102, the geographic area 540 may comprise an area having a fixed border that always remains within the communication footprint 506. In other implementations, the boundary of the geographic area 540 may be otherwise defined.

In order to relay the state data 198 or other data, the UTs 108 relaying data need to be within communication range of the satellites 102 that are being provided this functionality. For example, the one or more UTs 108 in the second set of UTs 108 specified by the relay designation data 162 are expected to be in communication range of the first satellite 102(1) before the handover time and in communication range of the second satellite 102(2) after the handover time. A UT 108 used to relay data may be simultaneously within range of both satellites at a given time, or may be consecutively within range of both satellites.

The first set of UTs 108 comprises the UTs 108 that are in communication range of the first satellite 102(1). For example, the first set of UTs 108 may be located within the communication footprint 506 of the beam 504 from the first satellite 102(1) until the handover time. In one implementation, the first set of UTs 108 is consistent before and after the handover time. For example, the first set of UTs 108 may be provided with communication services by the first satellite 102(1) before the handover time and then be provided with communication services by the second satellite 102(2) after the handover time. In other implementations, the composition of the first set of UTs 108 may change before and after the handover time. For example, some UTs 108 that are located at the periphery of the communication footprint 506 may be handed over to a third satellite 102(3) after the handover. In yet another example, some UTs 108 may be deactivated before the handover or activated after the handover. As a result, a first list of UT identifiers 404 in the first set of UTs 108 before the handover time may differ from a second list of UT identifiers after the handover time.

The determination of which UTs 108 to include in the relay designation data 162 may consider one or more factors. As described above, the category 402 of the UT 108 may be considered. The geographic location (geolocation) 520 of individual UTs 108 may also be considered. The second set of UTs 108 may comprise those UTs 108 that have a geolocation 520 that is, or is predicted to be, within a specified geographic area 540, such as a boundary associated with a geo area ID 414, and so forth.

In one implementation, UTs 108 may be determined to relay the state data 198 or other information based on their geolocation 520. For example, a UT 108 of a particular category that is located nearest a center of the communication footprint 506 may be selected. In another example, a UT 108 that is at an edge of the communication footprint 506 that is at a farthest point along the ground track 502 may be selected.

The second set of UTs 108 specified by the relay designation data 162 may include a plurality of UTs 108. For example, three UTs 108(1), 108(2), and 108(3) that are within the communication footprint 506 may be selected. These UTs 108 may be selected to be at least a minimum threshold distance 522 from one another, based on their respective geolocations 520. For example, the threshold distance 522 may be 50 miles, providing a minimum of 50 miles of physical separation between UTs 108 that will act as relays. The use of a threshold distance 522 may improve likelihood of successful transfer of the state data 198 by reducing the likelihood of localized events from interfering with operation of the UTs 108. For example, attenuation due to water in a rainstorm at the geolocation 520 of the first UT 108(1) may impair transmission of the state data 198 to or from the first UT 108(1). The second UT 108(2), located at least the threshold distance 522 away, may be experiencing clear skies and have no such impairment. The use of multiple UTs 108 to relay data provides redundancy, improving the likelihood of successful data transfer. Multiple UTs 108 may also improve security. For example, the state data 198 or other data to be relayed may be separated and distributed across multiple files, each being incomplete without the others. Each file may be encrypted for additional security. In the event of a compromise of the data relay system 192 of any one UT 108, the individual file would be useless to a compromising party.

In another implementation, a maximum threshold distance (not shown) may be specified. For example, one or more UTs 108 may be selected for the second set of UTs 108 based at least in part on their proximity to one another, to a specified geolocation such as a center of the communication footprint 506, and so forth.

Other criteria may be used to select the UTs 108 in the second set of UTs 108. For example, a combined ground track may be determined based on the first ground track 502(1) of the first satellite 102(1) and a second ground track 502(2) of the second satellite 102(2). The combined ground track may be calculated as a line that extends along a midpoint between the first ground track 502(1) and the second ground track 502(2). The UTs 108 having geolocations 520 that are located at least the threshold distance 522 from one another and nearest the combined ground track may be selected for inclusion in the second set of UTs 108.

In one implementation, a first geographic area 540 that communication service is to be provided within is determined. For example, the communication footprint 506 of the first satellite 102(1) may be determined, a geographic area 540 associated with a geo area ID 414 may be specified, and so forth. A first ground track 502(1) of the first satellite 102(1) may be determined. The first ground track 502(1) has a first entry point 530(1) to the first geographic area 540 and a first exit point 532(1) from the first geographic area 540. A second ground track 502(2) of the second satellite 102(2) may be determined. The second ground track 502(2) has a second entry point 530(2) to the first geographic area 540 and a second exit point 532(2) from the first geographic area 540. The first UT 108(1) that is predicted to be within communication range of both the first satellite 102(1) and the second satellite 102(2) may be determined based at least in part on the first UT 108(1) being: within the first geographic area 540; proximate to the first exit point 532(1); and proximate to the second entry point 530(2). For example, assuming the first geographic area 540 is a communication footprint 506 with a circular perimeter, the first UT 108(1) may be located along a geometric chord that extends from the first exit point 532(1) to the second entry point 530(2). Continuing the example, the first UT 108(1) may be selected that is nearest a midpoint of the geometric chord.

In another implementation, the determination of the second set of UTs 108 may comprise determining the first set of UTs 108 serviced by the first satellite 102(1) before a first time. The first time may comprise the handover time or another specified time, such as a particular time before or after the handover time. A second set of UTs 108 that are scheduled to be serviced by the second satellite 102(2) after the first time is also determined. Based on the first set and the second set, a third set is determined. For example, the third set comprises the intersection of the first set and the second set. The third set comprises the one or more UTs 108 that are: predicted to be in communication range of the first satellite 102(1) at a second time that is before the first time; and are predicted to be in communication range of the second satellite 102(2) at a third time that is after the first time. This may include either simultaneously being within communication range, or concurrently being within communication range. An interval between the second time and the third time may be specified that is less than a threshold value. This threshold value may be determined based at least in part on a quantity of data stored by one or more buffers of the first satellite 102(1) and an expected data transmission rate. For example, a buffer may store information about data to be sent on the uplink that is expected to take 10 milliseconds to send to the satellite 102. Continuing the example, the threshold value may be less than 5 milliseconds.

In other implementations, other techniques may be used to determine the UTs 108 specified by the relay designation data 162. In one implementation, the first satellite 102(1) may broadcast the state data 198 to all UTs 108 being provided communication service before the handover time. After the handover time, the second satellite 102(2) may interrogate particular UTs 108 to retrieve the state data 198. For example, the second satellite 102(2) may randomly select from a list of UT identifiers 404 provided by the management system 150. In another example, the second satellite 102(2) may select UTs 108 to retrieve the state data 198 from based on factors such as timestamp of an initial link signal, and so forth. In yet another implementation, other techniques may be used to specify a subset of the UTs 108, such as selecting based on category 402, at least a portion of MAC address values, and so forth. For example, the second satellite 102(2) may request that only those UTs 108 having a first value in a first octet of their MAC address respond.

Figure 6A:
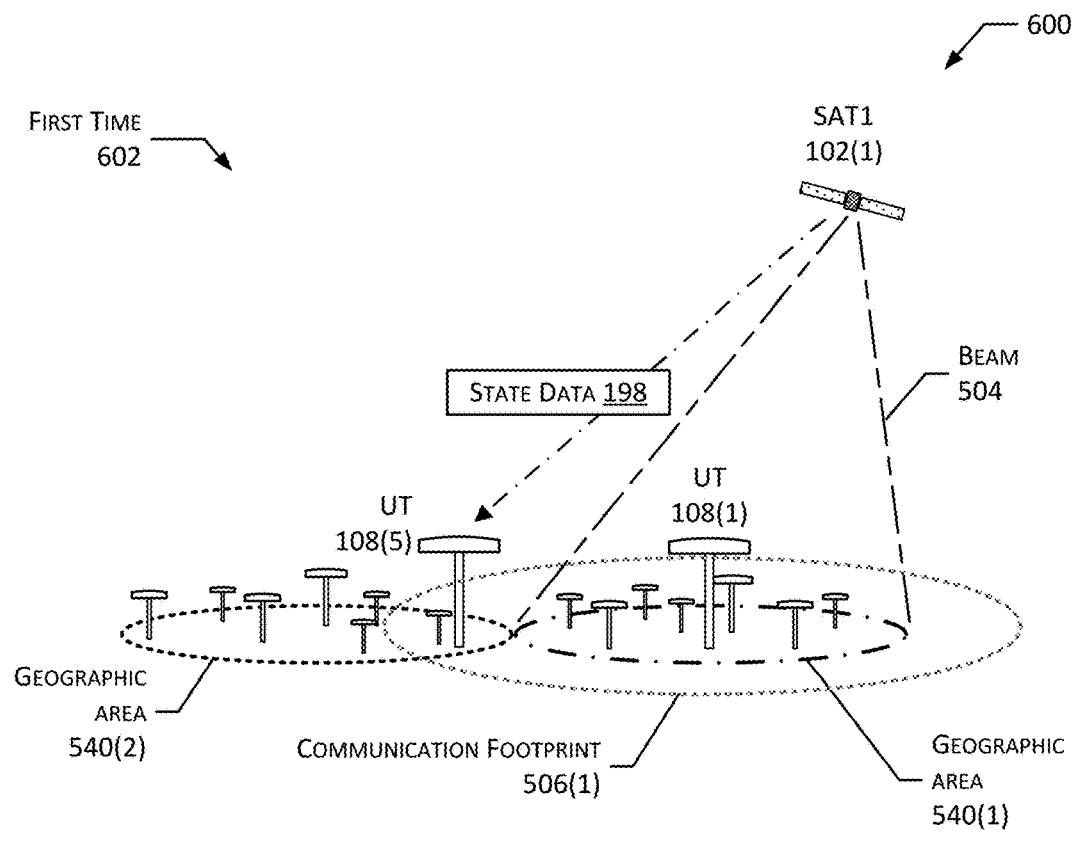
FIGS. 6A and 6B illustrate another implementation of distributed transfer of uplink state data, according to some implementations.
Figure 6A:
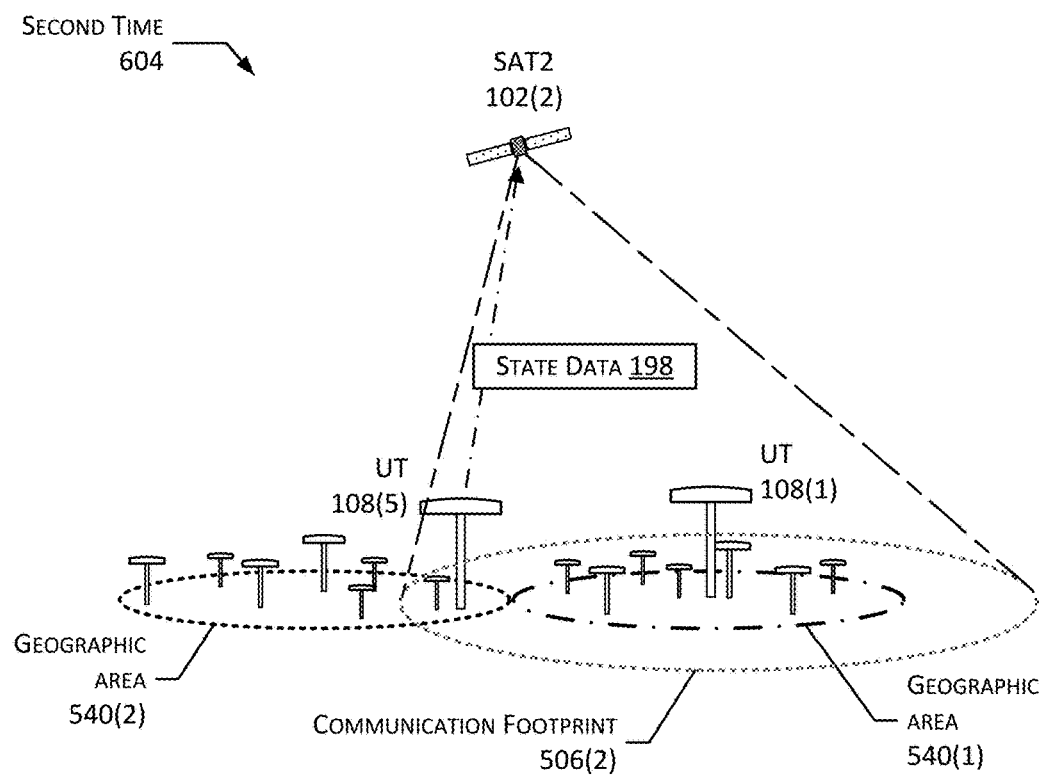
Figure 6B:
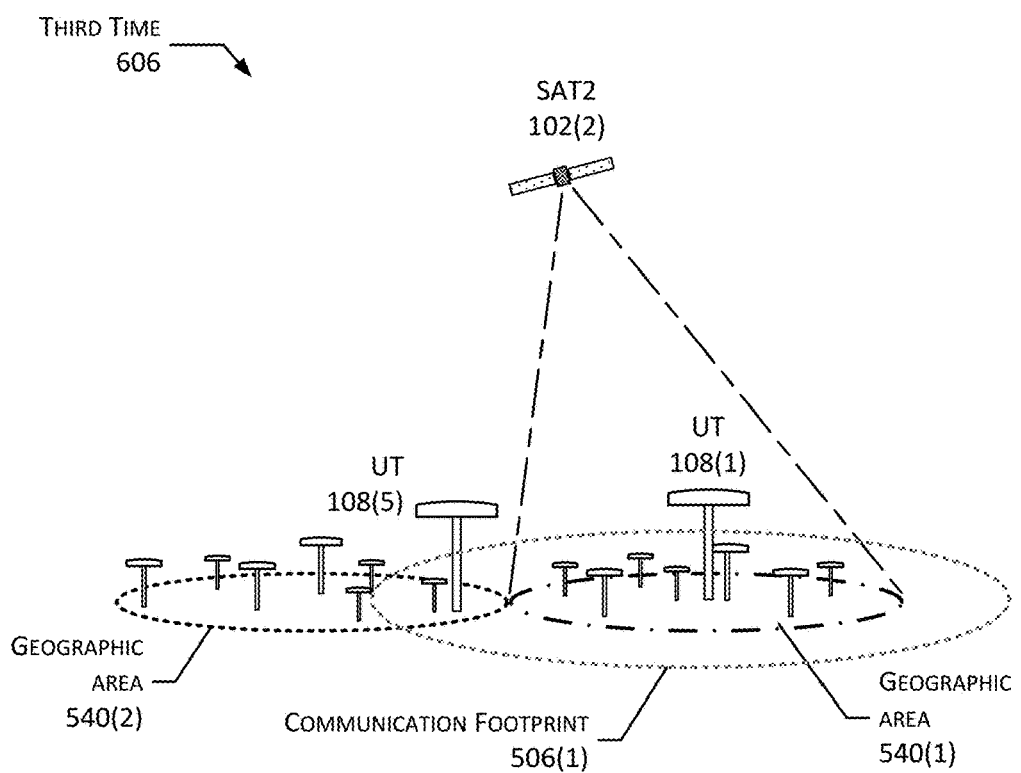

FIGS. 6A and 6B illustrate at 600 another implementation of distributed transfer of uplink state data 198 or other information, according to some implementations. In some implementations, a UT 108 may be used to transfer the state data 198 or other information that is not within the set of UTs 108 that is being provided communication services by one or more of the first satellite 102(1) or the second satellite 102(2). For example, a UT 108 that is, or will be, within the communication footprint 506 of the first satellite 102(1) and the second satellite 102(2), but is not within the same geographic area 540 as other UTs 108 may be used as a relay.

FIGS. 6A and 6B depict this implementation at a first time 602, a second time 604, and a third time 606. At the first time 602, the first satellite 102(1) is providing communication service to the UTs 108 located within a first geographic area 540(1). Before the handover time, the first satellite 102(1) sends the state data 198 to UT 108(5). UT 108(5) is at a geolocation 520 that is outside of the geographic area 540(1) and also is within the communication footprint 506(1) of the first satellite 102(1).

At the second time 604, the UT 108(5) sends the state data 198 to the second satellite 102(2). At the third time 606, the second satellite 102(2) provides communication service to the UTs 108 within the geographic area 540(1).

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a Global Position System receiver may be used to coordinate operation of one or more elements of the system 100.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a first user terminal (UT) comprising:
      a first network interface of the first UT;
      a first memory of the first UT; and
      a first set of one or more processors of the first UT executing instructions to:
         establish, using the first network interface of the first UT, a first connection with a first communication satellite;
         receive, using the first connection, first data that comprises state data associated with an uplink managed by the first communication satellite;

discontinue the first connection;
establish, using the first network interface of the first UT, a second connection with a second communication satellite; and
send, using the second connection, the first data to the second communication satellite.

2. The system of claim 1, the second communication satellite comprising:
a first network interface of the second communication satellite;
a first memory of the second communication satellite; and
a first set of one or more processors of the second communication satellite executing instructions to:
receive second data indicative of the first UT;
based at least in part on the second data, establish the second connection with the first UT using the first network interface of the second communication satellite;
receive the first data;
determine third data based on the first data, wherein the third data allocates to a second UT use of an uplink to the second communication satellite; and
send the third data to the second UT using the first network interface of the second communication satellite.

3. The system of claim 2, wherein the second connection with the first UT is prioritized on the uplink to the second communication satellite such that data from the first UT is sent via the uplink to the second communication satellite before data from a third UT.

4. The system of claim 1, the first data comprising one or more of:
media access control (MAC) addresses for individual ones of UTs in communication with the first communication satellite for which data has been received on the uplink,
quantity of data allocated to individual UTs that is queued for transmission on the uplink to the first communication satellite, or
grant data indicative of allocation to a particular UT to use the uplink at a later time.

5. The system of claim 1, further comprising:
a computer system comprising:
a first set of one or more processors of the computer system executing instructions to:
determine a first set of UTs provided with communication service by the first communication satellite at a first time;
determine a second set of UTs that are to be provided with communication service by the second communication satellite at a second time;
determine the first UT is included in the first set of UTs and the second set of UTs; and
send second data indicative of the first UT to the first communication satellite.

6. The system of claim 1, further comprising:
a computer system comprising:
a first set of one or more processors of the computer system executing instructions to:
determine a first time associated with a transfer of communication service provided to the first UT from the first communication satellite to the second communication satellite;
determine a first geographic area associated with the communication service;
determine a first ground track of the first communication satellite, wherein the first ground track has a first entry point to the first geographic area and a first exit point from the first geographic area;
determine a second ground track of the second communication satellite, wherein the second ground track has a second entry point to the first geographic area and a second exit point from the first geographic area;
determine that the first UT is:
within the first geographic area;
proximate to the first exit point; and
proximate to the second entry point;
determine second data indicative of the first UT; and
send the second data to the first communication satellite.

7. The system of claim 1, further comprising:
a computer system comprising:
a first set of one or more processors of the computer system executing instructions to:
determine a first set of UTs that are serviced before a first time by the first communication satellite;
determine a second set of UTs that are scheduled to be serviced after the first time by the second communication satellite; and
determine, based on the first set of UTs and the second set of UTs, that the first UT is:
predicted to be in communication range of the first communication satellite at a second time that is before the first time; and
predicted to be in communication range of the second communication satellite at a third time that is after the first time.

8. The system of claim 1, further comprising:
a computer system comprising:
a first set of one or more processors of the computer system executing instructions to:
determine that the first UT and a second UT are serviced by the first communication satellite at a first time and are scheduled to be serviced by the second communication satellite at a second time after the first time;
determine a first geolocation associated with the first UT;
determine a second geolocation associated with the second UT, wherein a distance between the second geolocation and the first geolocation is greater than a threshold distance;
determine second data indicative of the first UT and the second UT; and
send the second data to the first communication satellite.

9. The system of claim 1, further comprising:
the first communication satellite comprising:
a first network interface of the first communication satellite;
a first memory of the first communication satellite; and
a first set of one or more processors of the first communication satellite executing instructions to:
determine second data indicative of performance of the first connection;
based at least in part on the second data, determine third data that indicates the first UT is to be used to transfer the first data to the second communication satellite;
send, using at least one ground station, the third data to the second communication satellite; and
send the first data to the first UT using the first connection.

10. A system comprising:
a first satellite comprising:
  a first memory of the first satellite; and
  a first set of one or more processors of the first satellite executing instructions to:
    receive first data indicative of a first set of user terminals (UTs);
    establish communication with a second set of UTs, wherein the second set of UTs is a subset of the first set of UTs;
    receive, from one or more UTs in the second set of UTs, second data associated with an uplink managed by a second satellite; and
    determine, based at least in part on the second data, grant data that allocates use of an uplink of the first satellite by the first set of UTs.

11. The system of claim 10, further comprising the first set of one or more processors of the first satellite executing instructions to:
  send the grant data to one or more UTs in the first set of UTs; and
  based on the grant data, receive data via the uplink from the one or more UTs in the first set of UTs.

12. The system of claim 10, wherein the communication with the second set of UTs is prioritized compared to the UTs in the first set of UTs that are not included in the second set of UTs.

13. The system of claim 10, the first data comprising one or more of:
  media access control (MAC) addresses for individual ones of UTs in the first set of UTs,
  quantity of data scheduled for transmission to the first satellite that is associated with individual MAC addresses, or
  data indicative of an allocation to a particular MAC address to use the uplink at a later time.

14. The system of claim 10, further comprising:
a computer system comprising:
  a first set of one or more processors of the computer system executing instructions to:
    determine a third set of UTs provided with communication service by the second satellite before a first time;
    determine a fourth set of UTs that are to be provided with communication service by the first satellite after the first time;
    determine the first data indicative of the first set of UTs, based at least in part on the third set of UTs and the fourth set of UTs; and
    send the first data to the first satellite.

15. The system of claim 10, further comprising:
a computer system comprising:
  a first set of one or more processors of the computer system executing instructions to:
    determine a third set of UTs that are serviced before a first time by the second satellite;
    determine a fourth set of UTs that are scheduled to be serviced after the first time by the first satellite; and
    determine, based on the third set of UTs and the fourth set of UTs, the second set of UTs, wherein the second set of UTs includes one or more UTs that are:
      predicted to be in communication range of the second satellite at a second time that is before the first time; and
      predicted to be in communication range of the first satellite at a third time that is after the first time.

16. The system of claim 10, further comprising instructions to:
  determine the second set of UTs based on geolocations of individual UTs that are separated from one another by at least a first threshold distance.

17. A method comprising:
  determining a first set of user terminals (UTs) are scheduled for handover of communication services from a first satellite to a second satellite at a first time;
  determining a second set of UTs, wherein the second set of UTs is a subset of the first set of UTs;
  operating the first satellite to send first data to the second set of UTs before the first time, wherein the first data is associated with an uplink managed by the first satellite;
  operating the second satellite to retrieve the first data from the second set of UTs after the first time; and
  operating, based at least in part on the first data, the second satellite to manage communication from UTs in the first set of UTs to the second satellite.

18. The method of claim 17, wherein the determining the second set of UTs is based on one or more of:
  second data indicative of previous performance of the first set of UTs,
  category of UT,
  geolocation of individual ones of the UTs in the first set of UTs,
  communication footprint of the first satellite at the first time,
  communication footprint of the second satellite at the first time,
  ground track of the first satellite, or
  ground track of the second satellite.

19. The method of claim 17, further comprising:
  operating one or more of the second set of UTs to:
    receive, from the first satellite, the first data at or before the first time;
    store the first data; and
    send the first data to the second satellite at or after the first time.

20. The method of claim 17, wherein the first data comprises one or more of:
  media access control (MAC) addresses for individual ones of UTs in the first set of UTs,
  quantity of data scheduled for transmission to the first satellite that is allocated to individual MAC addresses, or
  data indicative of an allocation to a specified MAC address to use the uplink at a later time.

* * * * *